(12) United States Patent
Arai

(10) Patent No.: US 8,804,148 B2
(45) Date of Patent: Aug. 12, 2014

(54) IMAGE FORMING APPARATUS AND NON-TRANSITORY COMPUTER READABLE MEDIUM STORING A PROGRAM FOR CONTROLLING THE SAME

(75) Inventor: Tomomi Arai, Nagoya (JP)

(73) Assignee: Brother Kogyo Kabushiki Kaisha, Nagoya-Shi, Aichi-Ken (JP)

(*) Notice: Subject to any disclaimer, the term of this patent is extended or adjusted under 35 U.S.C. 154(b) by 114 days.

(21) Appl. No.: 13/612,774

(22) Filed: Sep. 12, 2012

(65) Prior Publication Data

US 2013/0077119 A1 Mar. 28, 2013

(30) Foreign Application Priority Data

Sep. 26, 2011 (JP) ................. 2011-208460

(51) Int. Cl.
- *G06F 3/033* (2013.01)
- *G03G 15/00* (2006.01)
- *B41J 29/00* (2006.01)

(52) U.S. Cl.
CPC ............. *B41J 29/00* (2013.01); *G06F 3/033* (2013.01); *G03G 15/502* (2013.01); *G03G 15/00* (2013.01)
USPC ........................ 358/1.13; 345/672; 345/538

(58) Field of Classification Search
USPC .................. 358/1.16, 1.13, 1.6, 1.9
See application file for complete search history.

(56) References Cited

U.S. PATENT DOCUMENTS

| | | | | |
|---|---|---|---|---|
| 6,014,581 A * | 1/2000 | Whayne et al. | ............... | 600/523 |
| 2005/0130738 A1* | 6/2005 | Miyamoto et al. | .............. | 463/30 |
| 2008/0171595 A1* | 7/2008 | Nakasaka | ........................ | 463/31 |
| 2010/0285845 A1* | 11/2010 | Sawada et al. | ................ | 455/566 |
| 2011/0199629 A1* | 8/2011 | Sensu et al. | .................... | 358/1.13 |
| 2011/0246933 A1* | 10/2011 | Toriyama | ...................... | 715/790 |
| 2012/0044169 A1* | 2/2012 | Enami | ............................ | 345/173 |
| 2012/0086650 A1* | 4/2012 | Oiwa | ............................ | 345/173 |
| 2012/0293406 A1* | 11/2012 | Park et al. | ..................... | 345/156 |
| 2012/0313976 A1* | 12/2012 | Shirakawa | .................... | 345/676 |
| 2013/0050276 A1* | 2/2013 | Moriya | .......................... | 345/672 |
| 2013/0300674 A1* | 11/2013 | Davidson | ..................... | 345/173 |

FOREIGN PATENT DOCUMENTS

| | | |
|---|---|---|
| JP | H08-211996 A | 8/1996 |
| JP | 2002-094712 A | 3/2002 |
| JP | 2007-068053 A | 3/2007 |
| JP | 2010-252079 A | 11/2010 |

* cited by examiner

*Primary Examiner* — Jerome Grant, II
(74) *Attorney, Agent, or Firm* — Merchant & Gould PC

(57) ABSTRACT

An image forming apparatus displays, on a display section, a plurality of button areas to which setting values in relation to functions of the image forming apparatus are assigned. In a case that an input form of an instruction coordinate to the display section is a predetermined first form, the setting values assigned to a button area in which the instruction coordinate is positioned are displayed on the display section. In a case that after the setting values are displayed and further that change operation for a specific setting value is inputted, the specific setting value is changed. In a case that the instruction coordinate is positioned in a button area of the plurality of button areas and that the input form of the instruction coordinate is a predetermined second form, the image forming apparatus is operated based on the setting values assigned in the button area.

15 Claims, 13 Drawing Sheets

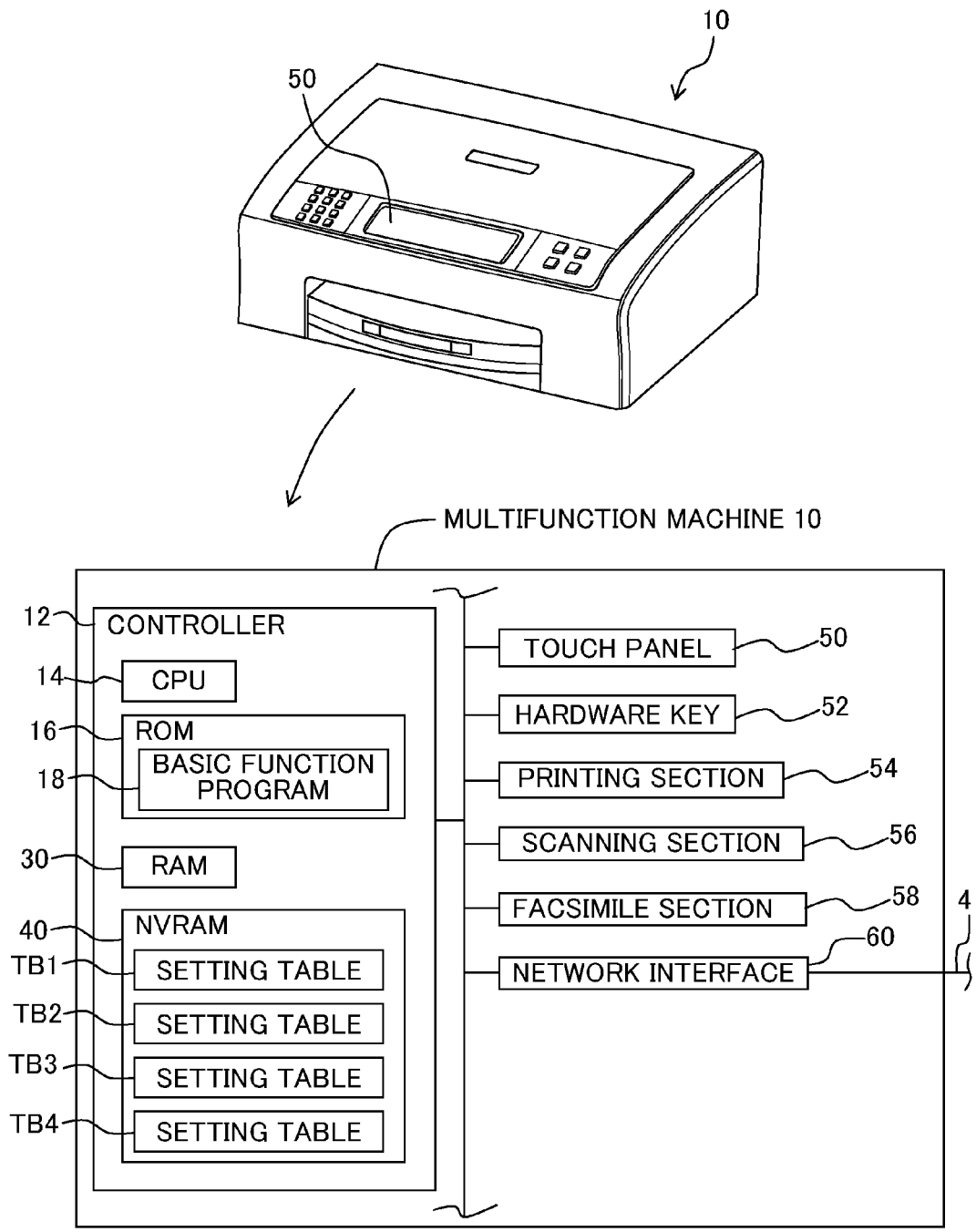

CUSTOM COPY

| CUSTOM BUTTON B1 CONTENT | SCAN SETTING | | | SPECIFIC INPUT FORM | CHANGE OBJECTIVE SETTING |
|---|---|---|---|---|---|
| | RESOLUTION | FILE TYPE | PAPER SIZE | COLOR SETTING | | |
| CUSTOM SCAN | 300dpi | PDF | A4 | COLOR | DOUBLE CLICK | RESOLUTION |

| CUSTOM BUTTON B2 CONTENT | COPY SETTING | | | | SPECIFIC INPUT FORM | CHANGE OBJECTIVE SETTING |
|---|---|---|---|---|---|---|
| | RESOLUTION | PAPER SIZE | COLOR SETTING | A SET OF PAPER SHEETS TO BE COPIED | | |
| CUSTOM COPY | 300dpi | A4 | COLOR | 1 | LONG KEY PRESS | A SET OF PAPER SHEETS TO BE COPIED |

211, 212, 201, 213, 214, 202, 203

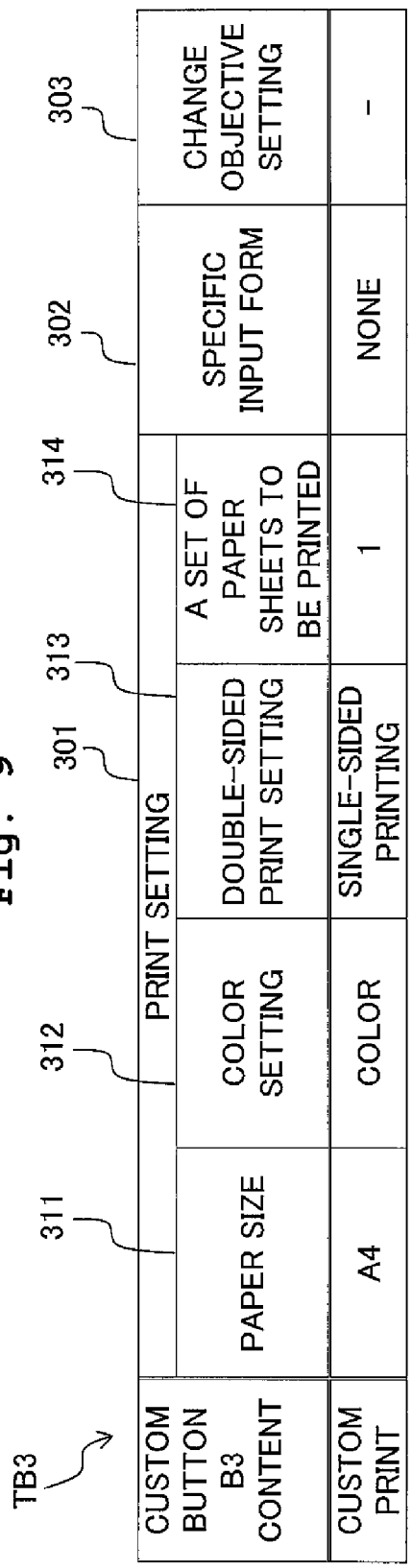
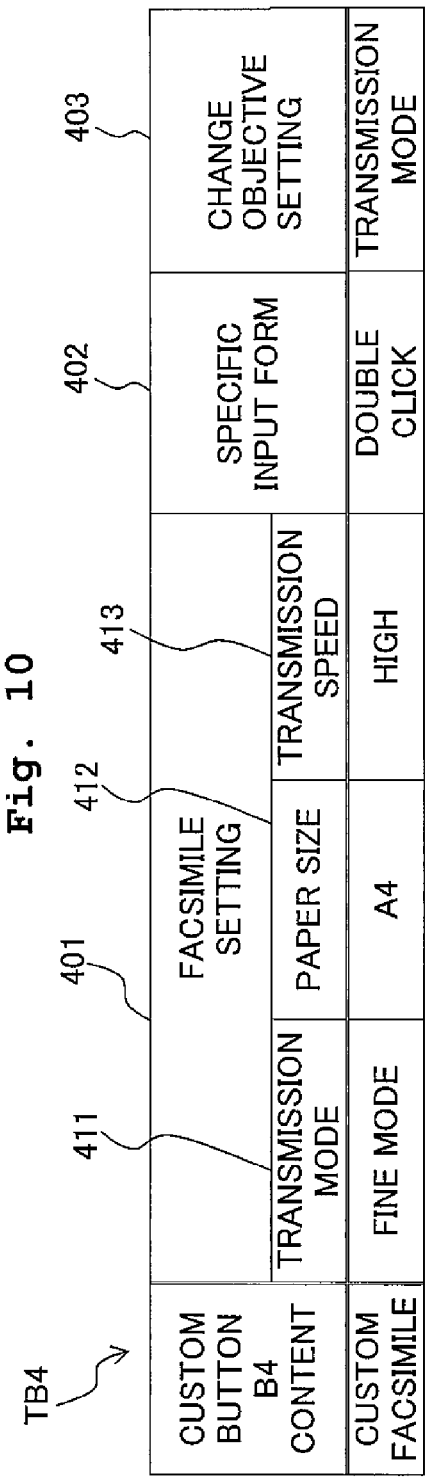

CUSTOM SCAN

Fig. 12

| TBA | | INPUT NUMERICAL VALUE | | | | |
|---|---|---|---|---|---|---|
| | CHANGE OBJECTIVE SETTING ITEM | 1 | 2 | 3 | 4 | 5 |
| 511 | RESOLUTION | 100dpi | 300dpi | 600dpi | 1200dpi | 2400dpi |
| 512 | FILE TYPE | BMP | JPG | PDF | PNG | — |
| 513 | PAPER SIZE | Letter | Legal | A5 | A4 | A3 |
| 514 | COLOR SETTING | MONOCHROME | GRAYSCALE | COLOR | — | — |
| 515 | A SET OF PAPER SHEETS | 1 SET OF PAPER SHEETS | 2 SETS OF PAPER SHEETS | 3 SETS OF PAPER SHEETS | 4 SETS OF PAPER SHEETS | 5 SETS OF PAPER SHEETS |
| 516 | DOUBLE-SIDED PRINT SETTING | SINGLE-SIDED | DOUBLE-SIDED | — | — | — |
| 517 | TRANSMISSION MODE | NORMAL | FINE | SUPER FINE | — | — |
| 518 | TRANSMISSION SPEED | NORMAL | HIGH | — | — | — |
| 519 | | 521 | 522 | 523 | 524 | 525 |

CUSTOM COPY

CUSTOM COPY

CUSTOM SCAN

IMAGE FORMING APPARATUS AND NON-TRANSITORY COMPUTER READABLE MEDIUM STORING A PROGRAM FOR CONTROLLING THE SAME

CROSS REFERENCE TO RELATED APPLICATION

The present application claims priority from Japanese Patent Application No. 2011-208460, filed on Sep. 26, 2011, the disclosure of which is incorporated herein by reference in its entirety.

BACKGROUND OF THE INVENTION

1. Field of the Invention

The present invention relates to an image forming apparatus which forms various images and non-transitory computer readable medium storing a program for controlling the image forming apparatus.

2. Description of the Related Art

Japanese Patent Application laid-open No. 2007-68053 describes a scanner device in which a specific scan setting is registered in an immediate execution button (example: one-click start key) in advance. In the scanner device, in a case that the immediate execution button is pressed, a process for scanning a document is immediately executed, based on the registered specific scan setting, without performing content confirmation of the scan setting, etc. On the other hand, in a case that a setting button is pressed, the scan setting is changed upon acceptance of input of the scan setting. Thereafter, the process for scanning the document is executed based on the scan setting after the change, when a start button is pressed.

SUMMARY OF THE INVENTION

In a recent image forming apparatus, there is a tendency of mounting a touch panel. Since button content to be displayed can be freely set in the touch panel, a plurality of immediate execution buttons can be displayed corresponding to various functions, such as a copying, scanning, and facsimile. However, there exists not only a case in which each of the various functions is executed immediately, but also a case in which each of the various functions is executed after a setting value is confirmed and changed. In this case, buttons for performing confirmation of the setting value, change of the setting value, etc., are also required to be displayed on the touch panel so that the buttons correspond to the various functions respectively. Thus, the number of buttons required to be displayed on the touch panel is increased, which would cause a situation in which all of the buttons can not be displayed on the touch panel and a situation in which a user has difficulty in finding a desired button. In the present application, there is provided a technique which is capable of solving these inconveniences.

According to an aspect of the present teaching, there is provided an image forming apparatus which includes a plurality of functions, the image forming apparatus including: a display section configured to display a plurality of button areas, which correspond to the plurality of functions respectively; a storage section configured to store a plurality of setting values, each of which is in relation to one of the plurality of functions; an input accepting section configured to accept an input to the display section; a coordinate detection section configured to detect an instruction coordinate which is inputted in the display section and is accepted by the input accepting section; a button display control section configured to assign each of the plurality of setting values, which is in relation to one of the plurality of functions and is stored in the storage section, to one of the plurality of button areas which corresponds to the one of the plurality of functions; and to display the plurality of button areas on the display section in a form which is distinguished from another area of the display section; a setting value display control section configured to display, on the display section, a group of setting values, among the plurality of setting values, which is assigned to a button area of the plurality of button areas, in a case that the instruction coordinate detected by the coordinate detection section is positioned in the button area and that an input form of the instruction coordinate accepted by the input accepting section is a predetermined first form; a setting change section configured to change a predetermined setting value, of the group of setting values, stored in the storage section, in a case that after the setting value display control section displays the group of setting values on the display section and further that the input accepting section accepts an input of change operation to instruct a change of the predetermined setting value; a first operation execution section configured to make the image forming apparatus execute a function corresponding to the button area, based on the group of setting values, in a case that after the setting value display control section displays the group of setting values on the display section and further that the input accepting section accepts an input of start operation to instruct a start of operation of the image forming apparatus; and a second operation execution section configured to make the image forming apparatus execute the function corresponding to the button area, based on the group of setting values, in a case that the instruction coordinate detected by the coordinate detection section is positioned in the button area and further that the input form accepted by the input accepting section is a predetermined second form different from the predetermined first form.

The image forming apparatus according to the aspect of the present teaching can accept two types of input forms including the first form and the second form by one button area. Thus, it is possible to assign, to one button area, two processes including a process in which the change of the setting value is accepted after the setting values are displayed on the display section and a process in which the image forming apparatus is operated immediately without displaying the setting values. Accordingly, as compared with a case in which the button areas are displayed depending on the respective processes, it is possible to reduce the number of button areas required to be displayed on the display section. Therefore, it is possible to prevent a situation in which all of the button areas can not be displayed on the display section, a situation in which the user has difficulty in finding a desired button area, etc., which would be otherwise caused due to the large number of buttons displayed on the display section.

BRIEF DESCRIPTION OF THE DRAWINGS

FIG. 1 shows an exterior appearance and a structure of a multifunction machine.
FIG. 7 is a first example of a setting table.
FIG. 8 is a second example of the setting table.
FIG. 9 is a third example of the setting table.

FIG. 10 is a fourth example of the setting table.

FIG. 12 is an example of a change objective setting table.

DESCRIPTION OF THE PREFERRED EMBODIMENTS

Figure 2A:
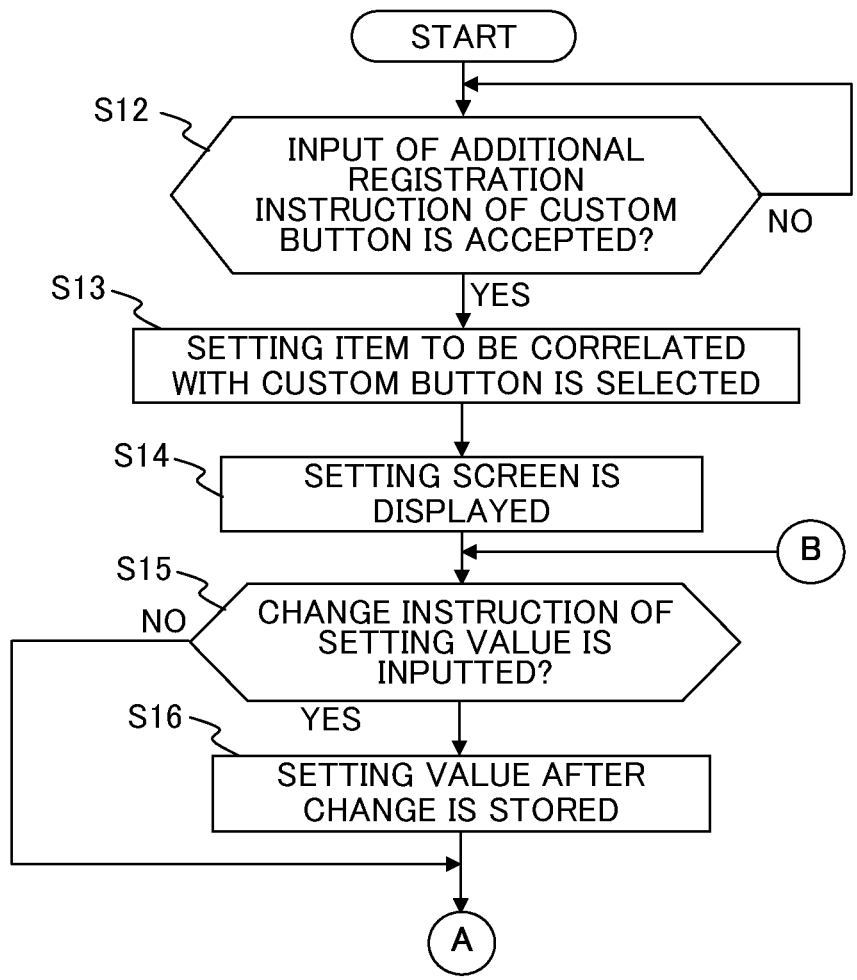
FIGS. 2A and 2B show a first flowchart showing operation of the multifunction machine.

FIG. 1 is a block diagram of a multifunction machine 10 which is exemplified as an embodiment according to the present application. Hereinafter, in some cases, the multifunction machine is referred to as Multifunction Peripheral, and the Multifunction Peripheral is abbreviated as MFP.
<Structure of Multifunction Machine 10>
The multifunction machine 10 is an apparatus having a printer function, a scanner function, a copy function, a facsimile function, a telephone function, and the like. The multifunction machine 10 includes a controller 12, a touch panel 50, a hard key 52, a printing section 54, a scanning section 56, a facsimile section 58, a network interface 60, etc. The controller 12 includes a CPU 14, a ROM 16, a RAM 30, a NVRAM (abbreviation of Non Volatile RAM) 40, etc.

In the ROM 16, a basic function program 18 for controlling a basic function of the multifunction machine 10 is stored. The CPU 14 executes various processes in accordance with a program stored in the ROM 16. The processes executed by the CPU 14 will be described later on. The RAM 30 is a volatile memory, which is a storage area for storing various types of data generated when the processes are executed in accordance with the basic function program 18.

Figure 4:
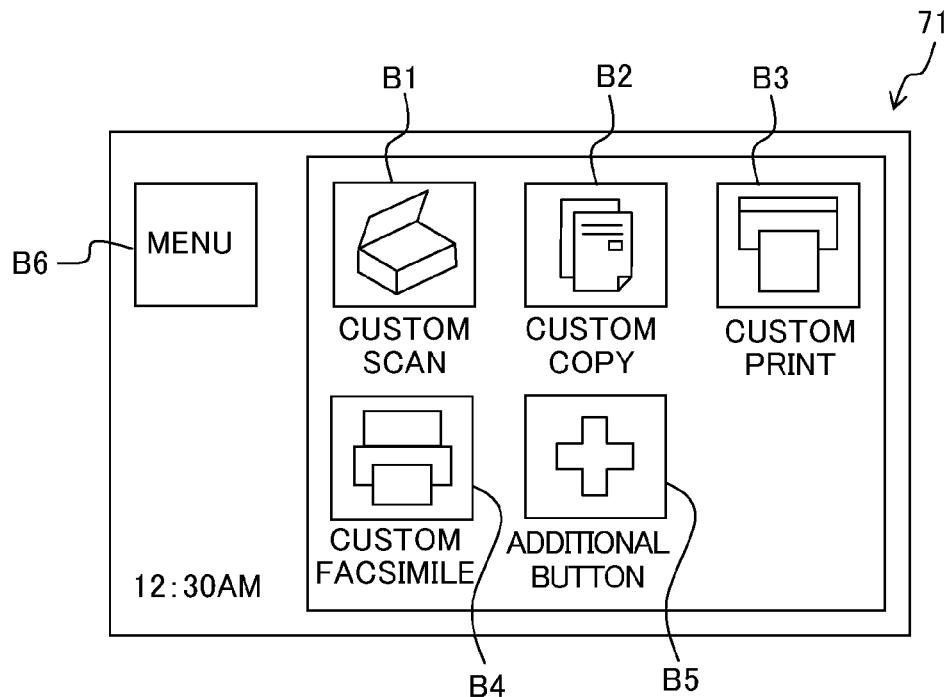
FIG. 4 is a first display example of a touch panel.

As shown in FIG. 1, the touch panel 50 is provided on an upper-surface front-surface side of the multifunction machine 10. The touch panel 50 has a function to detect an instruction coordinate, which is inputted so that the finger of a user or a stylus makes contact with or makes approach to the touch panel 50. Hereinafter, the stylus is referred to as a pen for the touch panel in some cases. The touch panel 50 has a function to display various images. FIG. 4 shows a display example of a standby screen 71 displayed on the touch panel 50. The standby screen 71 is the uppermost level display screen in a menu display of a hierarchical structure. The hierarchical structure is a structure in which, in a case that one of button images in a display screen in one level is selected, the display screen is changed to a screen at the next level lower than the one level and then a button image, which is different from said button images, is displayed. On the standby screen 71, custom buttons B1 to B4, an additional button B5, and a menu button B6 are displayed. These buttons are displayed by using API (Application Program Interface) of the basic function program 18.

Each of the custom buttons B1 to B4 is a button to which an operation setting in relation to operation of the multifunction machine 10 can be assigned after the operation setting is edited in accordance with a setting value of user's preference. The custom button B1 is a button related to "custom scan". A scan setting edited in advance is correlated with the custom button B1 and is stored therein. The scan setting includes various settings (for example, a resolution, a file type, and a paper size) used when a scan process is executed by the scanning section 56. The scan process is executed, based on the scan setting edited in advance, when the user touches the custom button B1. Here, "touch" or "touched" means that the finger of the user or the stylus makes contact with or makes approach to any of coordinates on the touch panel 50.

The custom button B2 is a button related to "custom copy". A copy setting edited in advance is correlated with the custom button B2 and is stored therein. The copy setting includes various settings (for example, a color setting, the paper size, and a set of paper sheets to be copied) used when a copy process is executed. The copy process is a process to print a document read by the scanning section 56 by using the printing section 54. The copy process is executed, based on the copy setting edited in advance, when the user touches the custom button B2.

The custom button B3 is a button related to "custom print". A print setting edited in advance is correlated with the custom button B3 and is stored therein. The print setting includes various settings (for example, the color setting, the paper size, and presence or absence of double-sided printing) used when a print process is executed by using the printing section 54. The print process is executed, based on the print setting edited in advance, when the user touches the custom button B3.

The custom button B4 is a button related to "custom facsimile". A facsimile setting edited in advance is correlated with the custom button B4 and is stored therein. The facsimile setting includes various settings (for example, a transmission mode and a communication speed) used when a facsimile transmission process is executed by using the facsimile section 58. The facsimile transmission process is executed, based on the facsimile setting edited in advance, when the user touches the custom button B4.

The additional button B5 is a button related to addition of the custom button. A new custom button is displayed on the standby screen 71, when the user touches the custom button B5. The menu button B6 is a button related to a display of a menu screen. The menu screen at the level lower than the standby screen 71 is displayed on the touch panel 50, when the user touches the custom button B6.

The NVRAM 40 is a nonvolatile memory. Setting tables TB1 to TB4 and a change objective setting table TBA are stored in the NVRAM 40. The setting tables TB1 to TB4 are setting tables of "custom scan" format, "custom copy" format, "custom print" format, and "custom facsimile" format, respectively. Initial setting values for respective setting items are set in the setting tables TB1 to TB4 at the time of manufacturing of the multifunction machine 10. Initial setting values for backup are stored in an area, of the NVRAM 40, which is different from the setting tables TB1 to TB4 at the time of manufacturing of the multifunction machine 10. Format information with respect to "custom scan" setting table, "custom copy" setting table, "custom print" setting table, and "custom facsimile" setting table is stored in the NVRAM 40 at the time of manufacturing of the multifunction machine 10. The setting table TB1 is a table in which there is stored a scan setting 101, a specific input form 102, and a change objective setting 103, those of which are correlated with the custom button B1. FIG. 7 shows an example of the setting table TB1. The scan setting 101 includes setting items of a resolution 111, a file type 112, a paper size 113, and a color setting 114. The resolution 111 is a resolution used when the document is scanned by the scanning section 56. The file type 112 is a file type (examples: PDF, JPEG, bitmap, etc.) used when image data generated by the scan process is stored. The paper size 113 is a document size (examples: A4, B4, etc.). The color setting 114 is a setting item about which one of a color and a monochrome (black and white) is used in execution of the scan process.

The specific input form 102 is an input form which is correlated with the custom button B1. In a case that the instruction coordinate is inputted in a display area in which the custom buttons are displayed (custom button display area) by the input form selected as the specific input form 102, the scan process is immediately started based on the scan setting 101 without displaying a setting screen (example: screen of FIG. 5) as will be described later on. Here, "instruction coordinate is inputted" or "input instruction coordinate" means that the finger of the user or the stylus makes contact with or makes approach to any of the coordinates on the touch panel 50. The input form is exemplified by a long key press (key hold), a double click, etc. The long key press is an input in which the instruction coordinate is inputted in the custom button display area continuously for not less than a predetermined time. The double click is an input in which the instruction coordinate is inputted in the custom button display area two times in quick succession.

The change objective setting 103 is a setting which can be changed by inputting a specific input numerical value after the instruction coordinate is inputted in a display area of the custom button B1 in the input form set in the specific input form 102. As the setting value of the change objective setting 103, any one of the scan setting 101 including the resolution 111, the file type 112, the paper size 113, and the color setting 114 can be selected.

FIG. 8 shows an example of the setting table TB2. The setting table TB2 is a table in which there is stored a copy setting 201, a specific input form 202, and a change objective setting 203, those of which are correlated with the custom button B2. The copy setting 201 includes setting items of a resolution 211, a paper size 212, a color setting 213, and a set of paper sheets to be copied 214. The set of paper sheets to be copied 214 is a setting item about the set of paper sheets to be copied. The setting value of the specific input form 202 is determined in a similar manner to the value setting manner of the specific input form 102. The change objective setting 203 is a setting which can be changed by inputting the specific input numerical value after the instruction coordinate is inputted in a display area of the custom button B2 in the input form set in the specific input form 202. As the setting value of the change objective setting 203, any one of the copy setting 201 including the resolution 211, the paper size 212, the color setting 213, and the set of paper sheets to be copied 214 can be selected.

FIG. 9 shows an example of the setting table TB3. The setting table TB3 is a table in which there is stored a print setting 301, a specific input form 302, and a change objective setting 303, those of which are correlated with the custom button B3. The print setting 301 includes setting items of a paper size 311, a color setting 312, a double-sided print setting 313, and a set of paper sheets to be printed 314. The double-sided print setting 313 is a setting about which one of single-sided printing and the double-sided printing is performed. The set of paper sheets to be printed 314 is a setting item about the set of paper sheets to be printed. The setting value of the specific input form 302 is determined in a similar manner to the value setting manner of the specific input form 102. The change objective setting 303 is a setting which can be changed by inputting the specific input numerical value after the instruction coordinate is inputted in a display area of the custom button B3 in the input form set in the specific input form 302. As the setting value of the change objective setting 303, any one of the print setting 301 including the paper size 311, the color setting 312, the double-sided print setting 313, and the set of paper sheets to be printed 314 can be selected.

FIG. 10 shows an example of the setting table TB4. The setting table TB4 is a table in which there is stored a facsimile setting 401, a specific input form 402, and a change objective setting 403, those of which are correlated with the custom button B4. The facsimile setting 401 includes setting items of a transmission mode 411, a paper size 412, and a transmission speed 413. The transmission mode 411 is a setting item about a mode at the time of a facsimile transmission (for example, a fine mode and a normal mode). The transmission speed 413 is a setting item about the communication speed at the time of the facsimile transmission. The setting value of the specific input form 402 is determined in a similar manner to the value setting manner of the specific input form 102. The change objective setting 403 is a setting which can be changed by inputting the specific input numerical value after the instruction coordinate is inputted in a display area of the custom button B4 in the input form set in the specific input form 402. As the setting value of the change objective setting 403, any one of the facsimile setting 401 including the transmission mode 411, the paper size 412, and the transmission speed 413 can be selected.

FIG. 12 shows an example of the change objective setting table TBA. The change objective setting table TBA is a table in which there is stored a change objective setting item 511 and setting values 521 to 525, those of which are in relation to the settings settable in the change objective settings 103 to 403 in the setting tables TB1 to TB4. The change objective setting item 511 includes setting items of a resolution 512, a file type 513, a paper size 514, a color setting 515, a set of paper sheets 516, a double-sided print setting 517, a transmission mode 518, and a transmission speed 519. The setting values 521 to 525 are setting values related to the setting items included in the change objective setting item 511, and the setting values 521 to 525 correspond to input numerical values 1 to 5, respectively. For example, as for the resolution 512, the setting value 521 corresponding to the input numerical value 1 is 100 dpi; the setting value 522 corresponding to the input numerical value 2 is 300 dpi; the setting value 523 corresponding to the input numerical value 3 is 600 dpi; the setting value 524 corresponding to the input numerical value 4 is 1200 dpi; and the setting value 525 corresponding to the input numerical value 5 is 2400 dpi. Note that, in FIG. 12, each column where the symbol "–" is shown means that the setting value corresponding to the input numerical value is not set for the setting item. For example, in the file type 513, the setting value corresponding to the input numerical value 5 is not set. The resolution 512 corresponds to the resolution 111 of the setting table TB1. In particular, an explanation will be made about a case in which the resolution 111 is set in the change objective settings 103 of the setting table TB1. In this case, when the input numerical value 5 is input after the instruction coordinate is inputted in the display area of the custom button B1 in the input form set in the specific input form 102, 2400 dpi, which is stored in the change objective setting table TBA as the setting value corresponding to the input numerical value 5 in the resolution 512, is set in the resolution 111. Further, in this case, when each of the input numerical values 1, 2, 3, and 4 is inputted, one of 100 dpi, 300 dpi, 600 dpi, and 1200 dpi is set in the resolution 111. The resolution 512 also corresponds to the resolution 211 of the setting table TB2. That is, when the input numerical value 5 is inputted after the instruction coordinate is inputted in the display area of the custom button B2 in the input form set in the specific input form 202, 2400 dpi is set in the resolution 211. The file type 513 corresponds to the file type 112. The paper size 514 corresponds to the paper sizes 113, 212, 311, 412. The color setting 515 corresponds to the color settings 114, 213, 312. The set of paper sheets 516 corresponds to the set of paper sheets to be copied 214 and the set of paper sheets to be printed 314. The double-sided print setting 517 corresponds to the double-sided print setting 313. The transmission mode 518 corresponds to the transmission mode 411. The transmission speed 519 corresponds to the transmission speed 413. Further, in the NVRAM 40, various parameters are stored. The parameters stored in the NARAM 40 are exemplified by an additional click time and a click judging time. The additional click time is a time for judging presence of absence of additional click operation as will be described later on. The click judging time is a time for judging as to whether or not the input form of the instruction coordinate in the display area of the custom button is the click or the long key press. These parameters may be set by the user in advance.

The hard key 52 is a physical input button (for example, a numerical key pad) for inputting various types of information. The printing section 54 is a section to execute the printing. The scanning section 56 is a section which reads the document to generate the data thereof. The facsimile section 58 is a section to transmit and receive the generated data of the document. The network interface 60 is a section which is connected to a wired LAN circuit 4 and transmits and receives the various types of data.

<Operation of Multifunction Machine 10>

An explanation will be made with reference to flowcharts of FIGS. 2 and 3 about the operation of the multifunction machine 10 according to the first embodiment. The flow of each of FIGS. 2 and 3 is started when the multifunction machine 10 is powered on, and is continued until the multifunction machine 10 is powered off.

Figure 2B:
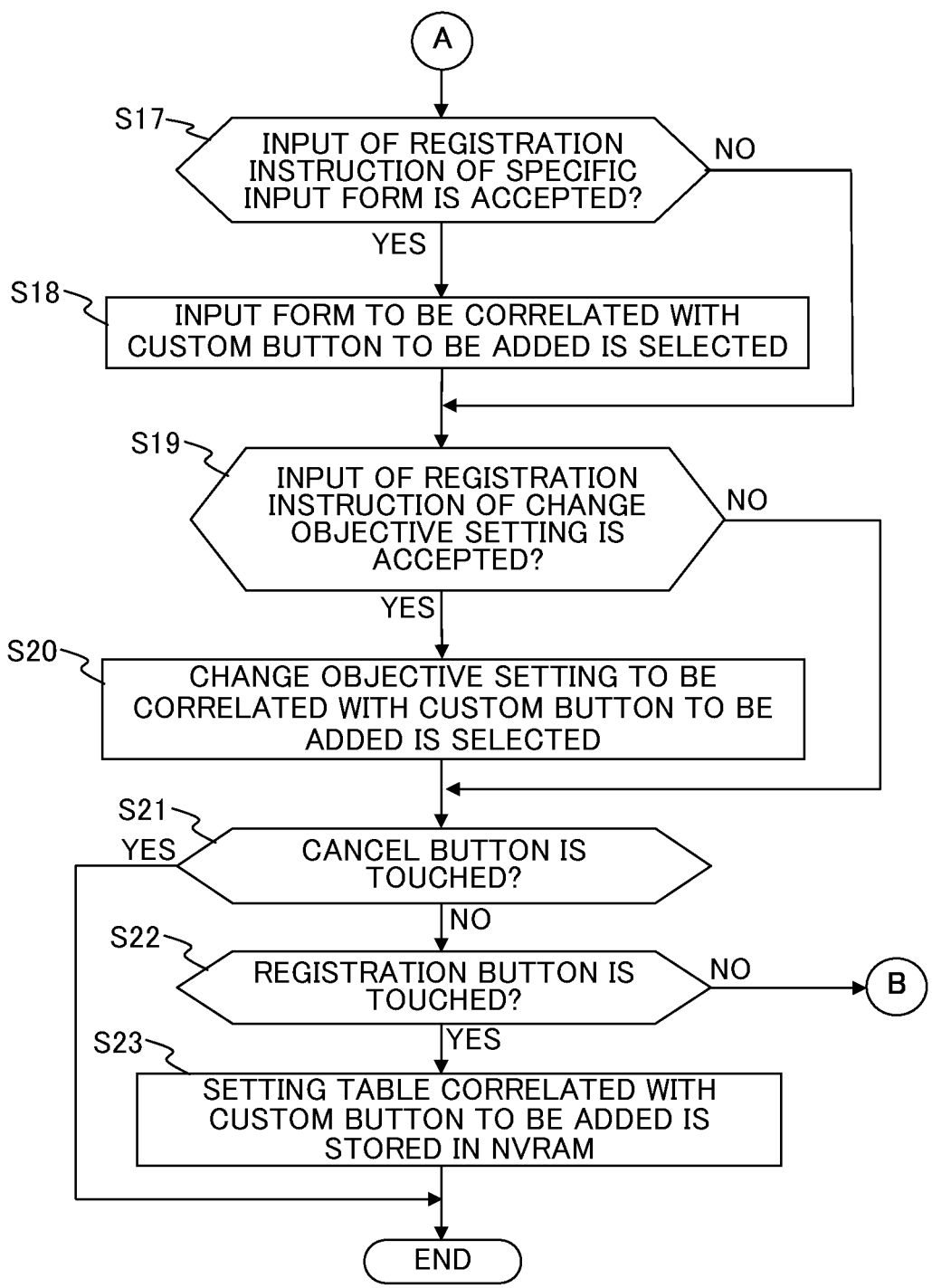

An explanation will be made about the flowchart of FIGS. 2A and 2B. In the flowchart of FIGS. 2A and 2B, a process, in which a new custom button is added and a setting table correlated with the added custom button is edited, is performed. In S12, the CPU 14 judges as to whether or not input of an additional registration instruction of the custom button is accepted. This judgment is performed based on whether or not the additional button B5 is touched. In a case that the input of the additional registration instruction of the custom button is not accepted (S12: NO), the process returns to S12. In a case that the input of the additional registration instruction of the custom button is accepted (S12: YES), the process proceeds to S13.

Figure 5:
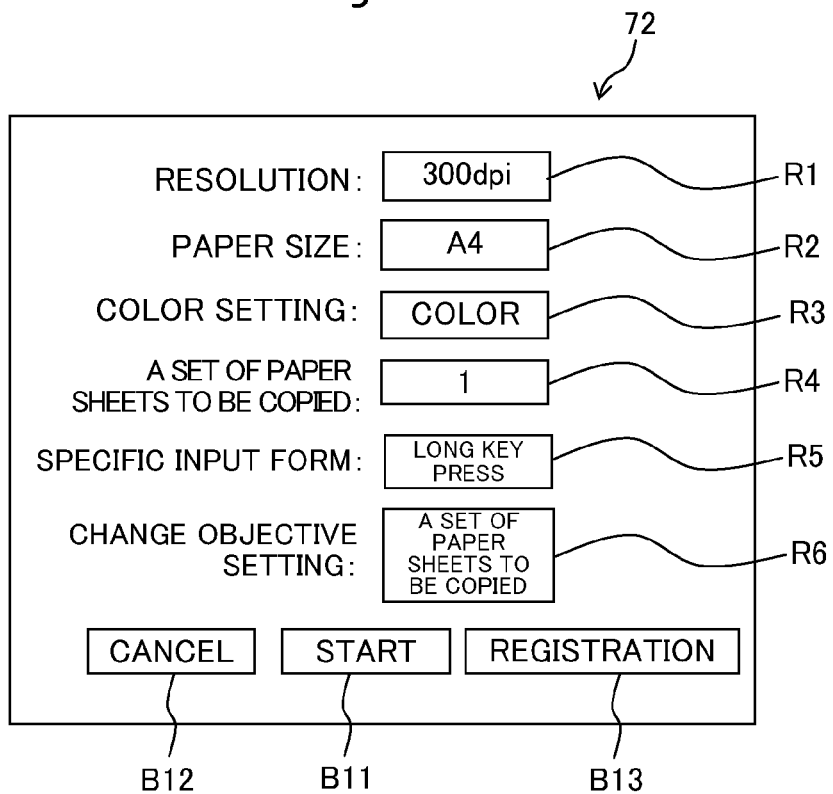
FIG. 5 is a second display example of the touch panel.

In S13, the CPU 14 accepts the input to add the custom button corresponding to a setting item selected by the user. In particular, the input may be accepted as follows. That is, the buttons corresponding to the setting items of "custom scan", "custom copy", "custom print", and "custom facsimile" are displayed on the touch panel 50, and then the user touches the button, among the buttons displayed on the touch panel 50, which corresponds to the setting item to be correlated with the custom button to be added. Hereinafter, each of the buttons corresponding to one of "custom scan", "custom copy", "custom print", and "custom facsimile" is also referred to as "candidate button". Each of the candidate buttons corresponding to one of "custom scan", "custom copy", "custom print", and "custom facsimile" has the same shape as one of the custom buttons B1 to B4. The custom buttons corresponding to "custom scan", "custom copy", "custom print", and "custom facsimile" respectively correspond to "custom scan" format, "custom copy" format, "custom print" format, and "custom facsimile" format of the setting tables, respectively. In a case that the candidate button is touched, the setting table corresponding to the touched candidate button is loaded into the RAM 30. Hereinafter, the setting table loaded into the RAM 30 is also referred to as "setting table on load". The initial setting values of the setting items included in the setting table are loaded into the setting table on load from the NARAM 40. In S14, the CPU 14 displays a setting screen 72 on the touch panel 50. FIG. 5 shows a display example of the setting screen 72 in a case that the candidate button corresponding to the setting item of "custom copy" is touched. The setting screen 72 is a display screen belonging to the next level lower than the standby screen 71 in the menu display in the hierarchical structure. The respective initial setting values of the resolution 211, the paper size 212, the color setting 213, and the set of paper sheets to be copied 214, those of which are stored in the setting table on load, are displayed in the respective setting items R1 to R4 of the setting screen 72. The initial setting values of the specific input form 202 and the change objective setting 203 are displayed in the setting items R5 and R6 of the setting screen 72, respectively. Further, a start button B11, a cancel button B12, and a registration button B13 are displayed. It is noted that the start button B11 is displayed grayed-out by the CPU 14 to indicate that operation in S140 of FIG. 3B as will be described later on is not performed even when the start button B11 displayed in S14 is touched. In S15, the CPU 14 judges as to whether or not input of a change instruction of the setting item is accepted. A method for inputting the change instruction may be a method as follows. That is, when any of the setting items R1 to R4 on the setting screen 72 is touched, a plurality of setting value candidates of the touched setting item are displayed. Then, when any of the setting value candidates is touched, the touched setting value candidate is selected as a setting value after the change. In a case that the input of the change instruction is not accepted (S15: NO), the process proceeds to S17. In a case that the input of the change instruction is accepted (S15: YES), the process proceeds to S16. In S16, the CPU 14 overwrites and stores the setting value after the change, which was selected in S15, in the setting table on load. Then, the process proceeds to S17. In S17, the CPU 14 judges as to whether or not the input of the registration instruction of the specific input form is accepted. This judgment is performed based on whether or not the setting item R5 of the specific input form, of the various setting items displayed in S14, is touched. In a case that the input of the registration instruction of the specific input form is not accepted (S17: NO), the process proceeds to S19. In a case that the input of the registration instruction of the specific input form is accepted (S17: YES), the process proceeds to S18. In S18, the CPU 14 executes a process in which an input form to be correlated with the custom bottom to be added is selected and stored. A method for selecting the input form may be a method as follows. That is, a list of input form candidates (for example, the long key press and the double click) is displayed on the touch panel 50. Then, the input form of the input form candidates touched on the touch panel 50 is stored in the setting table on load as the selected input form. In S19, the CPU 14 judges as to whether or not input of the registration instruction of the change objective setting is accepted. This judgment is performed based on whether or not the setting item R6 of the change objective setting, of the various setting items displayed in S14, is touched. In a case that the input of the registration instruction of the change objective setting is not accepted (S19: NO), the process proceeds to S21. In a case that the input of the registration instruction of the change objective setting is accepted (S19: YES), the process proceeds to S20. In S20, the CPU 14 executes a process in which a change objective setting to be correlated with the custom bottom to be added is selected and stored. A method for selecting the change objective setting may be a method as follows. That is, a list of the copy setting 201 is displayed on the touch panel 50. In other words, the resolution 211, the paper size 212, the color setting 213, and the set of paper sheets to be copied 214 are displayed on the touch panel 50. Then, the setting item of the copy setting 201 touched on the touch panel 50 is stored in the setting table on load as the setting item selected as the change objective setting. In S21, the CPU 14 judges as to whether or not the cancel button B12 is touched. In a case that the cancel button B12 is touched (S21: YES), the flow is completed without storing the setting table on load in the NVRAM 40. In a case that the cancel button B12 is not touched (S21: NO), the process proceeds to S22. In S22, the CPU 14 judges as to whether or not the registration button B13 is touched. In a case that the registration button B13 is not touched (S22: NO), the process returns to S15. In a case that the registration button B13 is touched (S22: YES), the process proceeds to S23. In S23, the CPU 14 stores the setting table on load in the NVRAM 40 as a setting table TB7. Further, the CPU 14 stores additional custom button information BD7 which indicates a new custom button B7 in the NVRAM 40 so that the additional custom button information BD7 is correlated with the setting table TB7. Then, the flow is completed. The additional custom button information BD7 is information for the CPU 14 to recognize that the custom button, which has the same shape as the candidate button corresponding to the setting item of "custom copy", is to be displayed on the standby screen 71 as the new custom button B7. By storing the additional custom button information BD7 and the setting table TB7 in the NVRAM 40, the CPU 14 can display the new custom button B7 on the standby screen 71. Further, the CPU 14 can execute a process corresponding to the touch to the new custom button B7. In S23, in a case that the additional custom button information BD7 and the setting table TB7 have already been stored in the NVRAM 40, another additional custom button information is correlated with another setting table by the CPU 14, and said another additional custom button information and said another setting table are stored in the NVRAM 40 by the CPU 14. By doing so, the CPU 14 can display another custom button on the standby screen 71 and can execute a process corresponding to the touch to said another custom button. Noted that, in S13, operations performed when the candidate buttons, which correspond to the respective setting items of "custom scan", "custom print", and "custom facsimile", are touched are similar to the operation performed when the candidate button which corresponds to the setting item of "custom copy" is touched. Thus, any explanation of which will be omitted.

Figure 3A:
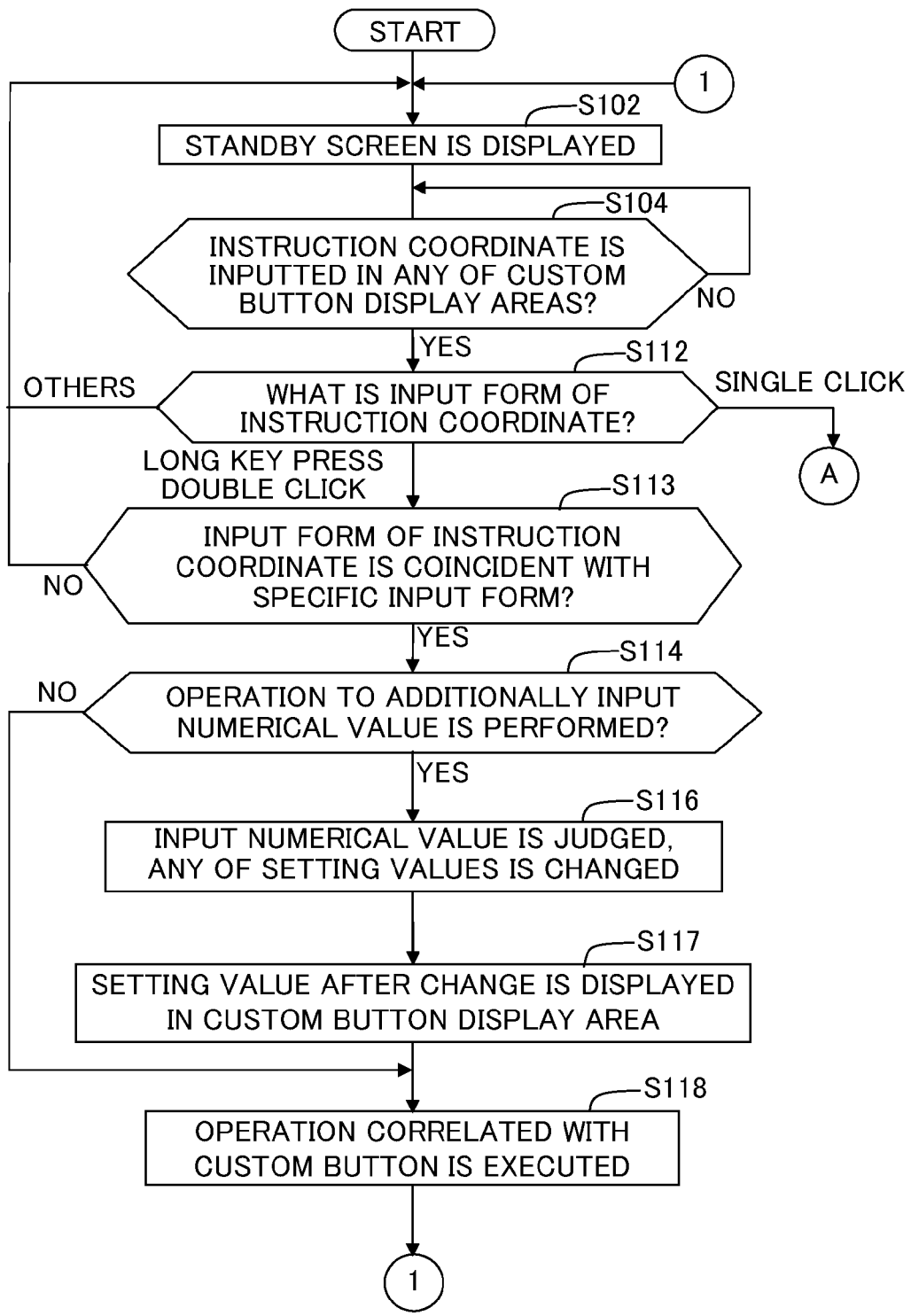
FIGS. 3A and 3B show a second flowchart showing the operation of the multifunction machine.
Figure 3B:
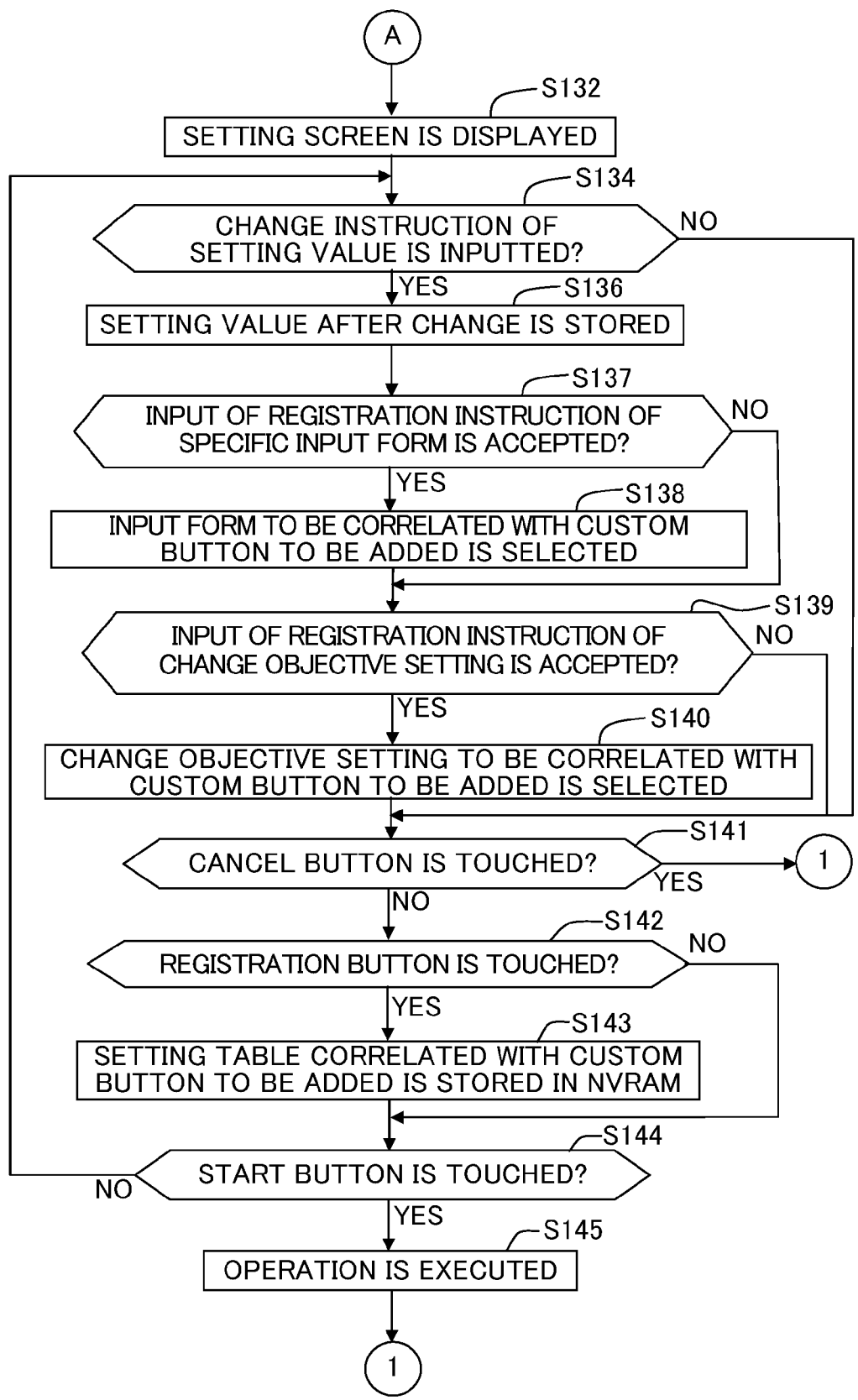
Figure 13:
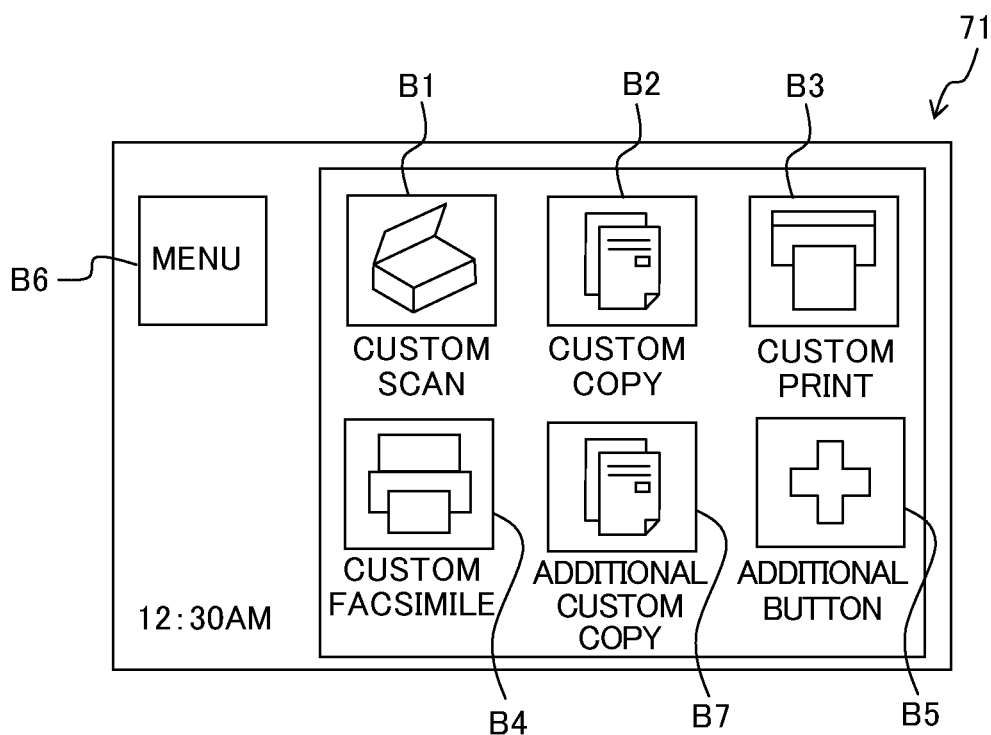
FIG. 13 is a display example of the touch panel on which an additional custom button is displayed.

An explanation will be made about the flowchart of FIGS. 3A and 3B. In the flowchart of FIGS. 3A and 3B, operation correlated with the touched custom button is executed by the multifunction machine 10. In S102, the CPU 14 displays the standby screen 71 on the touch panel 50. As shown in the display example of FIG. 13, the custom buttons B1, B2, B3, B4, and B7 are displayed, on the standby screen 71, in a form capable of being distinguished from one another. In particular, a coordinate indicating a custom button display area, which is a display area to display any one of the custom buttons B1 to B4, the additional button B5, the added custom button B7, etc., is stored in the ROM 16 in advance. In the ROM 16, coordinates of a plurality of custom button display areas are stored. Sequential numbers are assigned to the plurality of custom button display areas, respectively. The first display area is a display area to be displayed in the coordinate of the most upper left position, and display areas subsequent to the second display area also have coordinates to be displayed, respectively. The CPU 14 displays the custom buttons B1 to B4 in the first to fourth display areas, respectively; and displays the custom button corresponding to the additional custom button information in the fifth display area in the case that the additional custom button information is stored in the NVRAM 40. In a case that a plurality of pieces of additional custom button information are stored, custom buttons corresponding to the plurality of pieces of additional custom button information subsequent to the second additional custom button information are displayed in display areas subsequent to the sixth display area. Then, the CPU 14 displays the additional button in a display area, which is next to the last display area. FIG. 13 is a display example of the standby screen 71 in a case that only the additional custom button information BD7 is stored in the NVRAM 40 as the additional custom button information. In this case, the CPU 14 displays the custom button B7 in the fifth display area; and displays the additional button in the sixth display area.

In S104, the CPU 14 judges as to whether or not the instruction coordinate is inputted in any of the custom button display areas. An example of a judging method will be specifically explained. The CPU 14 obtains the instruction coordinate of a touched point on the touch panel 50 from the basic function program 18. In a case that the obtained instruction coordinate is positioned in the coordinate indicating any of the custom button display areas, the CPU 14 judges that the instruction coordinate is inputted in the custom button display area in which the instruction coordinate is positioned. In a case that the instruction coordinate is not inputted in any of the custom button display areas (S104: NO), the process returns to S104. In a case that the instruction coordinate is inputted on any of the custom button display areas (S104: YES), the process proceeds to S112.

In S112, the CPU 14 judges as to whether or not the input form of the instruction coordinate in the custom button display area is a single click; the long key press or the double click; or any other forms. An example of a judging method will be specifically explained.

In a case that the instruction coordinate is not detected any more in a custom button display area, of the plurality of custom button display areas, in which the instruction coordinate was positioned, after the instruction coordinate is detected in the custom button display area and before a predetermined click judging time elapses, the CPU 14 judges that the input form is the single click.

In a case that operation, in which the instruction coordinate is not detected any more in a custom button display area, of the plurality of custom button display areas, in which the instruction coordinate was positioned, after the instruction coordinate is detected in the custom button area and before the predetermined click judging time elapses, is detected twice, the CPU 14 judges that the input form is the double click.

In a case that the instruction coordinate continues to be detected in a custom button display area, of the plurality of custom button display areas, in which the instruction coordinate is positioned, after the instruction coordinate is detected in the custom button area and until the predetermined click judging time elapses, the CPU 14 judges that the input form is the long key press.

In a case that the CPU judges in S112 that the input form of the instruction coordinate is other than the single click, the long key press, and the double click (S112: others), the process returns to S102. On the other hand, in a case that the CPU 14 judges that the input form of the instruction coordinate is the single click (S112: single click), the process proceeds to S132. Hereinbelow, an explanation will be made about operation, in which the instruction coordinate is inputted in the display area of the custom button B2 in the form of the single click in S132 to S145, in order to simplify the explanation. Noted that since operation in which the instruction coordinate is inputted in the display area of each of the custom buttons B1, B3, and B4 in the form of the single click is similar to the operation in which the instruction coordinate is inputted in the display area of the custom button B2 in the form of the single click, any explanation of which will be omitted.

In S132, the CPU 14 stores the setting table on load in the RAM 30 and displays the setting screen 72 shown in FIG. 5 on the touch panel 50 in accordance with the setting values stored in the setting table on load. In particular, the setting values stored in the setting table corresponding to the touched custom button are loaded into the RAM 30 and then are stored in the RAM 30 as the setting values of the setting table on load. In accordance with the setting values, the setting screen 72 is displayed. In a case that the custom button B2 is single-clicked, the setting values stored in the setting table TB2 are loaded into the RAM 30. In S132, the start button B11 is displayed as usual by the CPU 14. The "displayed as usual" means that the start button B11 is displayed without being grayed-out.

In S134 to S143, since the CPU 14 executes the processes which are similar to those of S15 to S23, any explanation of which will be omitted. In S144, the CPU 14 judges as to whether or not the start button B11 is touched. In a case that the start button B11 is not touched (S144: NO), the process returns to S134. In a case that the start button B11 is touched (S144: YES), the process proceeds to S145. In S145, the CPU 14 executes a process (for example, a copy process) in which the document is scanned by the scanning section 56 and the scanned data is printed by using the printing section 54, based on the setting values stored in the setting table on load. Then, the process proceeds to S102.

On the other hand, in a case that the CPU 14 judges in S112 that the input form of the instruction coordinate is the long key press or the double click (S112: the long key press or the double click), the process proceeds to S113. Hereinbelow, an explanation will be made about operation, in which the instruction coordinate is inputted in the display area of the custom button B2 in the form of the long key press in S113 to S118, in order to simplify the explanation. Noted that since operation in which the instruction coordinate is inputted in the display area of each of the custom buttons B1, B3, and B4 in the form of the long key press or the double click is similar to the operation in which the instruction coordinate is inputted in the display area of the custom button B2 in the form of the long key press or the double click, any explanation of which will be omitted.

In S113, the CPU 14 judges as to whether or not the input form of the instruction coordinate is coincident with the specific input form. In a case that the input form of the instruction coordinate is not coincident with the specific input form (S113: NO), the process returns to S102. In a case that the input form of the instruction coordinate is coincident with the specific input form (S113: YES), the process proceeds to S114. In this embodiment, since the input form (for example, the long key press) of the instruction coordinate in the display area of the custom button B2 is coincident with the specific input form 202 stored in the setting table TB2 (S113: YES), the process proceeds to S114. It is noted that the CPU 14 stores the setting values, which are stored in the setting table TB2, in the RAM 30 as the setting values of the setting table on load, when the process proceeds to S114.

In S114, the CPU 14 judges as to whether or not operation, in which the numerical value is additionally inputted in the custom button display area to which the instruction coordinate was inputted in the specific input form, is performed. In particular, the CPU 14 judges as to whether or not a new instruction coordinate is detected in the custom button display area to which the instruction coordinate was inputted in the specific input form, after the instruction coordinate is inputted in the custom button display area in the specific input form and before a predetermined additional click time elapses. That is, the CPU 14 judges as to whether or not the additional click operation is performed. In a case that the additional click operation is not performed (S114: NO), the process proceeds to S118. In a case that the additional click operation is performed (S114: YES), the process proceeds to S116.

In S116, the CPU 14 measures the number of operation times of the additional click operation. In particular, the CPU 14 measures the number of times a new instruction coordinate is detected in the custom button display area. Then, the number of operation times of the additional click operation, measured by the CPU 14, is judged as the input numerical value, and the setting value of the setting item, which is stored in the setting table on load as the change objective setting, is changed based on the change objective setting table TBA. In this embodiment, the setting value of the set of paper sheets to be copied 214, which is selected as the change objective setting 203 in the setting table on load equivalent to the setting table TB2 shown in FIG. 8, is increased one by one depending on the number of operation times of the click operation.

Figure 6:
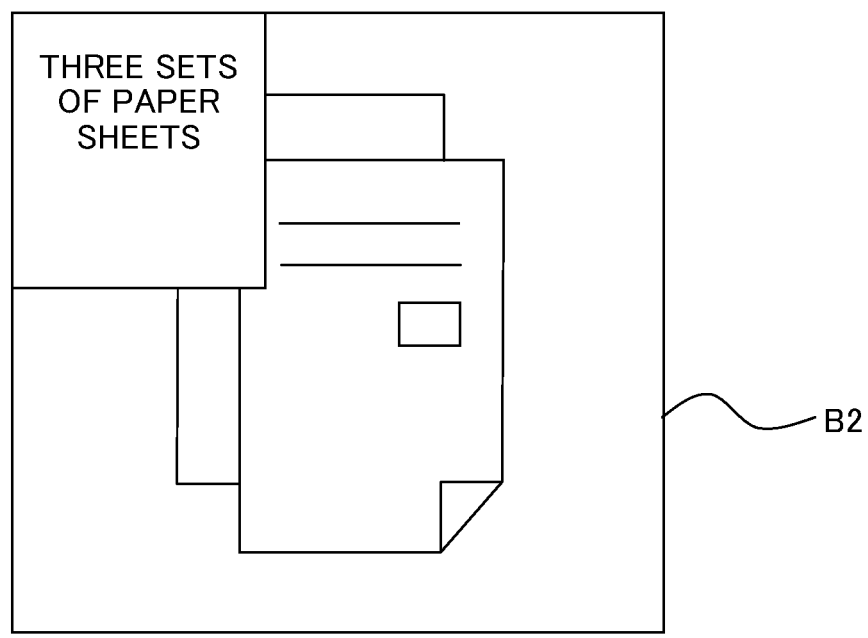
FIG. 6 is a first display example of a custom button.

In S117, the CPU 14 displays the setting value, which was changed by the additional click operation, in the custom button display area to which the instruction coordinate was inputted in the specific input form. In this embodiment, in a case that the additional click operation is performed twice, the set of paper sheets to be copied 214 is (equals) "three". Then, as shown in FIG. 6, "three copies" is displayed as the setting value of the set of paper sheets to be copied 214 at the upper left corner in the display area of the custom button B2. Then, the process proceeds to S118.

In S118, the CPU 14 executes the operation correlated with the custom button in accordance with the setting values of the setting table on load. In this procedure, in a case that any of the setting values was changed in S116, the operation is executed in accordance with the setting value after the change. In this embodiment, the copy process is executed in accordance with the setting value after the change. Then, the process returns to S102.

[Effect]

An effect of the multifunction machine 10 according to this embodiment will be explained. The multifunction machine 10 described in the present application is capable of accepting two types of input forms by one custom button. That is, two processes including the process in which the change of the setting value is accepted after the setting screen 72 is displayed and the process in which the multifunction machine 10 is immediately executed without displaying the setting screen 72 can be assigned to one custom button. Accordingly, as compared with a case in which the buttons are displayed for the respective processes, it is possible to reduce the number of buttons required to be displayed on the touch panel 50. Thus, it is possible to prevent a situation in which all of the buttons can not be displayed on the touch panel 50, a situation in which the user has difficulty in finding a desired button, etc., which would be otherwise caused due to the large number of buttons displayed on the touch panel 50.

Further, in a case that after the process in which the multifunction machine 10 is executed immediately without displaying the setting screen 72 is selected (S113: YES) and further that the additional click operation is performed to the custom button to which the instruction coordinate was inputted in the specific input form (S114: YES), the setting value of the setting item, which is selected as the change objective setting, can be changed (S116). Accordingly, it is possible to realize both the high work efficiency obtained by operating the multifunction machine 10 immediately and the degree of freedom of the change of the setting value.

Further, in the case that any of the custom buttons is single-clicked (S112: single click), it is possible to display the setting value assigned to the single-clicked custom button (S132) and to accept the change of the setting value (S136). Accordingly, even when any of the custom buttons is erroneously touched, the operation of the multifunction machine 10 is not started immediately, but the multifunction machine 10 can be controlled so that the setting value is displayed on the touch panel 50. Accordingly, it is possible to prevent malfunction of the multifunction machine 10.

Further, in the case that any of the custom buttons is held for a long press or double-clicked (S112: long key press or double click), it is possible to operate the multifunction machine 10 immediately (S118) without displaying the setting value assigned to the custom button which was held for the long press or double-clicked. When the user accidentally touches the touch panel 50, the long key press or the double click to any of the custom buttons is less likely to occur. Therefore, it is possible to prevent a situation such that the multifunction machine 10 is erroneously operated.

Further, the user is capable of freely selecting the specific input form correlated with the custom button (S17). Accordingly, it is possible to enhance user friendliness. It can be said that the specific input form is an input form for operating the multifunction machine 10 immediately.

Technical elements described in the present description or drawings show technical usability alone or by various combinations. The present teaching is not limited to combinations recited in claims originally filed. Further, techniques exemplified in the present description or drawings achieve a plurality of objects at the same time, and just to achieve one of the plurality of objects has the technical usability. Hereinbelow, modified embodiments will be described.

Modified Embodiment

The input forms selected as the specific input forms 102 to 402 are not limited to the long key press or the double click. For example, the input forms include a successive click of not less than three times, a slide, a flick, a gesture input indicating a specific symbol or alphabet, a multipoint touch, etc. The successive click of not less than three times is an input in which the instruction coordinate is inputted in the custom button display area three times or more in quick succession. The slide is an input in which the instruction coordinate is inputted in the custom button display area and then the instruction coordinate detected in the custom button display area is moved in a certain direction in a state that the instruction coordinate continues to be detected in the custom button display area. The flick is an input in which the instruction coordinate is inputted in the custom button display area and then the instruction coordinate detected in the custom button display area is moved at a speed of over a predetermined speed in a state that the instruction coordinate continues to be detected in the custom button display area. Further, in a case that the instruction coordinate is detected in any of the custom button display areas and further that a movement locus of the instruction coordinate is moved outside the custom button display area after the detection, it may be also judged that the input form is the flick. The gesture input is an input in which the instruction coordinate is inputted in the custom button display area and then the instruction coordinate detected in the custom button display area is moved to draw the specific symbol, character, or alphabet in the state that the instruction coordinate continues to be detected in the custom button display area. For example, in a case that a shape of the movement locus of the instruction coordinate, which is detected in any of the custom button display areas, corresponds to a predetermined shape (for example, round shape, L-type, and V-type), it may be judged that the input form is the gesture input. The multipoint touch is an input in which the instruction coordinates of not less than two points are inputted in the custom button display areas at the same time. In a case that the instruction coordinates of not less than two points are detected in any of the custom button display areas at the same time, it may be judged that the input form is the multipoint touch. Further, it is allowable to use, instead of the touch panel 50, an instruction coordinate detection panel which detects the input of the instruction coordinate performed at a position away from the instruction coordinate detection panel without being based on the contact or approach of the finger of the user or the stylus. In a case that the instruction coordinate detection panel is used and that the instruction coordinate is inputted by the touch in the custom button display area in S112, the process may proceed to S132 by the CPU 14. In a case that the instruction coordinate detection panel is used and that the instruction coordinate is inputted in the custom button display area at the position away from the instruction coordinate detection panel in S112, the process may proceed to S113 by the CPU 14. Further, it is allowable to use an instruction coordinate detection panel which can detect a three-dimensional instruction coordinate. In a case that the instruction coordinate detection panel which can detect the three-dimensional instruction coordinate is used and that the shape of the movement locus of the instruction coordinate corresponds to a predetermined three-dimensional shape in S112 in a state that the instruction coordinate continues to be detected in a three-dimensional space corresponding to the custom button display area, it may be judged by the CPU 14 that the input form is the gesture input. Further, it is allowable to use a sound input as the specific input form. In a case that the sound input is used as the specific input form and that the sound input to designate the custom button is inputted in S112, the process may proceed to S132 by the CPU 14.

In the embodiment described above, the explanation is made about the case in which two types of input forms are accepted by one custom button. However, the present teaching is not limited this embodiment, and it may be an embodiment in which the input forms of three types or more are accepted by one custom button.

Figure 11:
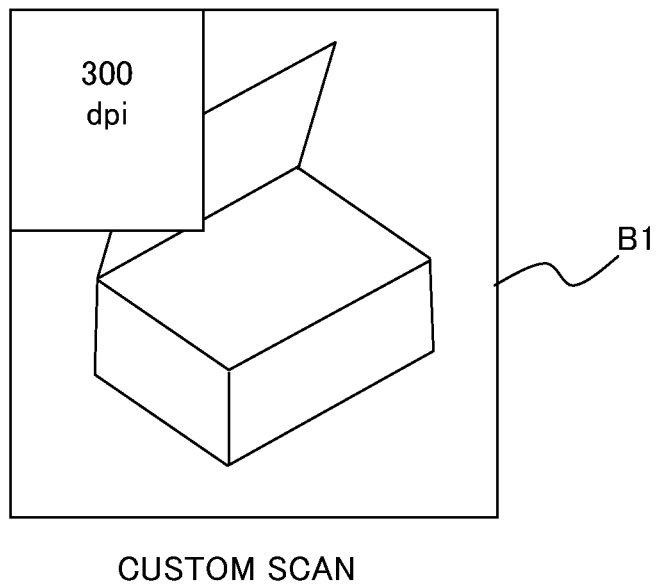
FIG. 11 is a second display example of the custom button.

The various setting items can be selected in the change objective settings 103 to 403, respectively. For example, an explanation will be made about a case in which the resolution 111 is selected as the change objective setting 103 in the setting table TB1 (FIG. 7). In this case, in the case that the instruction coordinate is inputted in the display area of the custom button B1 by the specific input form (S113: YES), the content of the resolution 111 (300 dpi in the case of FIG. 11), which is currently set in the setting table on load, is displayed at the upper left corner of the custom button B1 as shown in FIG. 11. Then, every time when the additional click is inputted in S116, the resolution 111 may be changed so that the number of clicks is regarded as the input numerical value, based on the change objective setting table TBA, in accordance with a predetermined order. For example, the resolution 111 may be changed to repeat 100 dpi, 300 dpi, 600 dpi, and 1200 dpi in that order every time when the additional click is inputted. In a case that the additional click is further inputted in a state that the input numerical value is 5, it may be judged that the input numerical value is returned to 1 or that the input numerical value remains at 5.

Figure 14A:
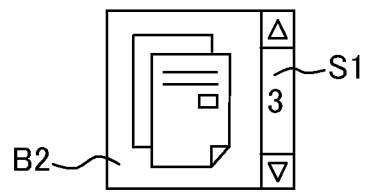
FIGS. 14A, 14B and 14D are display examples of the custom buttons with slider objects.
Figure 14B:
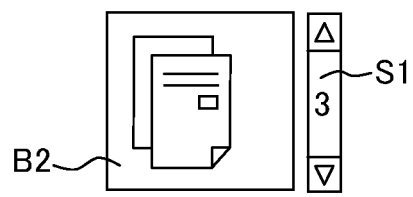
Figure 14C:
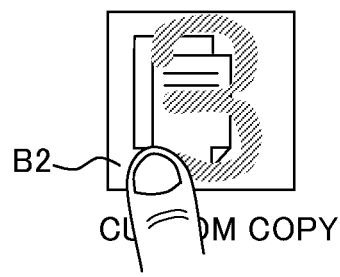
FIG. 14C is an example in which a setting value is changed by a gesture input.
Figure 14D:
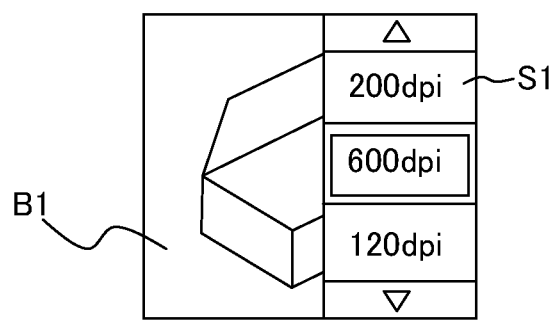

It is also allowable to adopt an embodiment in which the acceptance of the additional click operation (S114, S116, S118) is not performed. In this case, in the case that the input form of the instruction coordinate is coincident with the specific input form (S113: YES) in the flow of FIG. 3A, the process may proceed to S118 to execute the operation correlated with the custom button. Further, an input form of the numerical value for changing the setting value of the change objective setting is not limited to the additional click operation. For example, the input form of the numerical value for changing the setting value of the change objective setting includes the slide, the flick, the gesture input indicating the specific symbol or alphabet, the multipoint touch, etc. In a case that each of these forms is used and that a new instruction coordinate is inputted in the custom button display area in S114, it may be judged as "YES" by the CPU 14. In a case that the slide is used to input the numerical value, the CPU 14 may measure, in S116, a length of move of the instruction coordinate inputted in the custom button display area, the instruction coordinate inputted in the custom button display area being moved in a state that the instruction coordinate continues to be detected in the custom button display area. The CPU 14 may judge which one of 1 to 5 the input numerical value is when the instruction coordinate is not detected any more, depending on the length of the move of the instruction coordinate after the instruction coordinate is inputted and before the instruction coordinate is not detected any more. The CPU 14 changes the setting value of the change objective setting depending on the judged input numerical value. In a case that the flick is used to input the numerical value and that the instruction coordinate inputted in the custom button display area is not detected any more after the instruction coordinate is moved at a speed of over a predetermined acceleration, the CPU 14 may judge, in S116, which one of 1 to 5 the input numerical value is, depending on the acceleration of the move of the instruction coordinate. The CPU 14 may change the setting value of the change objective setting depending on the judged input numerical value. In a case that the instruction coordinate inputted in the custom button display area is not detected any more after the instruction coordinate is moved at a speed of under the predetermined acceleration, the CPU 14 may judge that the numerical value is inputted by the slide. In a case that the instruction coordinate inputted in the custom button display area is not detected any more after the instruction coordinate is moved at the speed of over the predetermined acceleration, the CPU 14 may judge that the numerical value is inputted by the flick. Further, the CPU 14 may add the numerical value depending on the length of the move of the instruction coordinate inputted in the custom button display area, while the instruction coordinate inputted in the custom button display area is moved at the speed of under the predetermined acceleration. In a case that the instruction coordinate inputted in the custom button display area is not detected any more after the instruction coordinate is moved at the speed of over the predetermined acceleration, the CPU 14 may further add the numerical value depending on the acceleration. In a case that the gesture input is used to input the numerical value, the CPU 14 may judge, in S116, which one of 1 to 5 the input numerical value is, depending on the symbol or alphabet drawn by the instruction coordinate inputted in the custom button display area in the state that the instruction coordinate continues to be detected in the custom button display area. The CPU 14 may change the setting value of the change objective setting depending on the judged input numerical value. The symbol, the character, or the alphabet used in the gesture input is exemplified by a figure as shown in FIG. 14C. For example, in a case that "3" is drawn, the CPU 14 may determine that the input numerical value is "3". In a case that the multipoint touch is used to input the numerical value, the CPU 14 measures, in S116, how many instruction coordinates are inputted at the same time. The CPU 14 may judge which one of 1 to 5 the input numerical value is, depending on the number of instruction coordinates inputted. The CPU 14 may change the setting value of the change objective setting depending on the judged input numerical value. Further, it is allowable to use an object as the input form of the numerical value for changing the setting value of the change objective setting. In a case that the object is used and that a new instruction coordinate is inputted in the custom button display area in S114, it may be judged as "YES" by the CPU 14. In S116, the CPU 14 may display the object for the input of the numerical value to overlay the custom button. Alternatively, the CPU 14 may display the object for the input of the numerical value on a side of the custom button. The CPU 14 judges which one of 1 to 5 the input numerical value is depending on the new instruction coordinate inputted in a display area of the object. The CPU 14 may change the setting value of the change objective setting depending on the judged input numerical value. Further, as another example of when the object is used as the input form, in a case that it is judged as "YES" in S113 by the CPU 14, the CPU 14 may display the object for the input of the numerical value to overlay the custom button or the CPU 14 may display the object for the input of the numerical value on the side of the custom button. In S114, in a case that a new instruction coordinate is inputted in the display area of the object, it may be judged as "YES" by the CPU 14. In S116, the CPU 14 judges which one of 1 to 5 the input numerical value is depending on the new instruction coordinate inputted in the display area of the object. The CPU 14 may change the setting value of the change objective setting depending on the judged input numerical value. The object is exemplified by slider objects as shown in FIG. 14A, 14B, or 14D. In a case that a slider object is displayed, the CPU 14 may judge, in S116, which one of 1 to 5 the input numerical value is depending on an instruction coordinate inputted, by a slide input, in a display area of the slider object. Further, it is allowable to use, instead of the touch panel 50, the instruction coordinate detection panel which detects the input of the instruction coordinate performed at the position away from the instruction coordinate detection panel without being based on the contact or approach of the finger of the user or the stylus. In a case that the instruction coordinate detection panel is used and that the instruction coordinate is inputted in the custom button display area at the position away from the instruction coordinate detection panel in S114, it may be judged as "YES" by the CPU 14. In the case that the instruction coordinate detection panel is used, the CPU 14 may judge, in S114, which one of 1 to 5 the input numerical value is depending on the input of the instruction coordinate in the custom button display area at the position away from the coordinate detection panel. Further, it is allowable to use the instruction coordinate detection panel which can detect the three-dimensional instruction coordinate. In a case that the instruction coordinate detection panel which can detect the three-dimensional instruction coordinate is used, the CPU 14 may judge, in S116, which one of 1 to 5 the input numerical value is depending on the input of the instruction coordinate in the three-dimensional space corresponding to the custom button display area. Further, it is allowable to use the sound input for the additional input of the numerical value. In a case that the sound input is used to additionally input the numerical value and that the sound input is inputted in S113, it may be judged as "YES" by the CPU 14. In the case that the sound input is used to additionally input the numerical value, the CPU 14 may judge, in S116, which one of 1 to 5 the numerical value inputted by the sound input is.

The number of custom buttons displayed on the standby-screen 71 is not limited to four. It is possible to obtain the effect of the technical effect of the present application even in a case that the number of custom buttons is not more than three or not less than five.

Technical characteristic of the present application is that the display area of the touch panel 50 is effectively used. Therefore, the range of application of the technique of the present application is not restricted to the multifunction machine 10, and the technique of the present application is applicable to various apparatuses (for example, a mobile phone and a laptop computer) each having the display screen.

The various types of information, such as the setting tables TB1 to TB4, stored in the ROM 16 and/or the NVRAM 40 may be stored in an external storage device. Various processes may be executed after the various types of information is read from the external storage device and then is temporarily stored in the RAM 30. The external storage device is exemplified by a memory card, an external hard disk, etc.

Noted that the touch panel 50 is an example of a display section. The scan setting 101, the copy setting 201, the print setting 301, and the facsimile setting 401 are examples of a setting value. The custom buttons B1 to B4 are examples of a button area. The CPU 14 which executes S102 is an example of a button display control section. The single click is an example of a first form. The CPU 14 which executes S132 is an example of a setting value display control section. The CPU 14 which executes S136 is an example of a setting change section. The CPU 14 which executes S140 is an example of a first operation execution section. The long key press and the double click are examples of a second form. The CPU 14 which executes S118 is an example of a second operation execution section. The multifunction machine 10 is an example of an image forming apparatus. The click judging time is an example of a predetermined time. The CPU 14 which executes S17 is an example of a second form selection accepting section.

What is claimed is:

1. An image forming apparatus which includes a plurality of functions, the image forming apparatus comprising:
    a display section configured to display a plurality of button areas, which correspond to the plurality of functions respectively;
    a storage section configured to store a plurality of setting values, each of which is in relation to one of the plurality of functions;
    an input accepting section configured to accept an input to the display section;
    a coordinate detection section configured to detect an instruction coordinate which is inputted in the display section and is accepted by the input accepting section;
    a button display control section configured to assign each of the plurality of setting values, which is in relation to one of the plurality of functions and is stored in the storage section, to one of the plurality of button areas which corresponds to the one of the plurality of functions; and to display the plurality of button areas on the display section in a form which is distinguished from another area of the display section;
    a setting value display control section configured to display, on the display section, a group of setting values, among the plurality of setting values, which is assigned to a button area of the plurality of button areas, in a case that the instruction coordinate detected by the coordinate detection section is positioned in the button area and that an input form of the instruction coordinate accepted by the input accepting section is a predetermined first form;
    a setting change section configured to change a predetermined setting value, of the group of setting values, stored in the storage section, in a case that after the setting value display control section displays the group of setting values on the display section and further that the input accepting section accepts an input of change operation to instruct a change of the predetermined setting value;
    a first operation execution section configured to make the image forming apparatus execute a function corresponding to the button area, based on the group of setting values, in a case that after the setting value display control section displays the group of setting values on the display section and further that the input accepting section accepts an input of start operation to instruct a start of operation of the image forming apparatus; and
    a second operation execution section configured to make the image forming apparatus execute the function corresponding to the button area, based on the group of setting values, in a case that the instruction coordinate detected by the coordinate detection section is positioned in the button area and further that the input form accepted by the input accepting section is a predetermined second form different from the predetermined first form;
    wherein in a case that the coordinate detection section detects the instruction coordinate in the button area and then the coordinate detection section newly detects another instruction coordinate in the button area, the setting change section changes the predetermined setting value to a new setting value based on a characteristic of the another instruction coordinate, and the second operation execution section makes the image forming apparatus execute the function based on the new setting value; and
    wherein in a case that after the coordinate detection section detects the instruction coordinate in the button area and further that the instruction coordinate is moved to the another instruction coordinate in the button area and still further that the another instruction coordinate is not detected any more by the coordinate detection section, the setting change section changes the predetermined setting value to the new setting value based on a length from the instruction coordinate to the another instruction coordinate.

2. The image forming apparatus according to claim 1, wherein the predetermined first form is a form in which the instruction coordinate is detected in the button area by the coordinate detection section and the instruction coordinate is not detected any more by the coordinate detection section within a predetermined time period after the instruction coordinate is detected by the coordinate detection section.

3. The image forming apparatus according to claim 1, wherein the second input form includes a plurality of types of input forms, the image forming apparatus further comprises a second form selection accepting section configured to accept a selection of one of the plurality of types of input forms as the second form assigned to the button area; and to store the second form selected in the storage section.

4. An image forming apparatus which includes a plurality of functions, the image forming apparatus comprising:

a display section configured to display a plurality of button areas, which correspond to the plurality of functions respectively;

a storage section configured to store a plurality of setting values, each of which is in relation to one of the plurality of functions;

an input accepting section configured to accept an input to the display section;

a coordinate detection section configured to detect an instruction coordinate which is inputted in the display section and is accepted by the input accepting section;

a button display control section configured to assign each of the plurality of setting values, which is in relation to one of the plurality of functions and is stored in the storage section, to one of the plurality of button areas which corresponds to the one of the plurality of functions; and to display the plurality of button areas on the display section in a form which is distinguished from another area of the display section;

a setting value display control section configured to display, on the display section, a group of setting values, among the plurality of setting values, which is assigned to a button area of the plurality of button areas, in a case that the instruction coordinate detected by the coordinate detection section is positioned in the button area and that an input form of the instruction coordinate accepted by the input accepting section is a predetermined first form;

a setting change section configured to change a predetermined setting value, of the group of setting values, stored in the storage section, in a case that after the setting value display control section displays the group of setting values on the display section and further that the input accepting section accepts an input of change operation to instruct a change of the predetermined setting value;

a first operation execution section configured to make the image forming apparatus execute a function corresponding to the button area, based on the group of setting values, in a case that after the setting value display control section displays the group of setting values on the display section and further that the input accepting section accepts an input of start operation to instruct a start of operation of the image forming apparatus; and a second operation execution section configured to make the image forming apparatus execute the function corresponding to the button area, based on the group of setting values, in a case that the instruction coordinate detected by the coordinate detection section is positioned in the button area and further that the input form accepted by the input accepting section is a predetermined second form different from the predetermined first form;

wherein in a case that the coordinate detection section detects the instruction coordinate in the button area and then the coordinate detection section newly detects another instruction coordinate in the button area, the setting change section changes the predetermined setting value to a new setting value based on a characteristic of the another instruction coordinate, and the second operation execution section makes the image forming apparatus execute the function based on the new setting value; and wherein in a case that after the coordinate detection section detects the instruction coordinate in the button area and further that the instruction coordinate is moved to the another instruction coordinate in the button area at an acceleration which is not less than a predetermined acceleration and still further that the another instruction coordinate is not detected any more by the coordinate detection section, the setting change section changes the predetermined setting value to the new setting value based on the acceleration.

5. The image forming apparatus according to claim 4, wherein the predetermined first form is a form in which the instruction coordinate is detected in the button area by the coordinate detection section and the instruction coordinate is not detected any more by the coordinate detection section within a predetermined time period after the instruction coordinate is detected by the coordinate detection section.

6. The image forming apparatus according to claim 4, wherein the second input form includes a plurality of types of input forms, the image forming apparatus further comprises a second form selection accepting section configured to accept a selection of one of the plurality of types of input forms as the second form assigned to the button area; and to store the second form selected in the storage section.

7. An image forming apparatus which includes a plurality of functions, the image forming apparatus comprising:

a display section configured to display a plurality of button areas, which correspond to the plurality of functions respectively;

a storage section configured to store a plurality of setting values, each of which is in relation to one of the plurality of functions;

an input accepting section configured to accept an input to the display section;

a coordinate detection section configured to detect an instruction coordinate which is inputted in the display section and is accepted by the input accepting section;

a button display control section configured to assign each of the plurality of setting values, which is in relation to one of the plurality of functions and is stored in the storage section, to one of the plurality of button areas which corresponds to the one of the plurality of functions; and to display the plurality of button areas on the display section in a form which is distinguished from another area of the display section;

a setting value display control section configured to display, on the display section, a group of setting values, among the plurality of setting values, which is assigned to a button area of the plurality of button areas, in a case that the instruction coordinate detected by the coordinate detection section is positioned in the button area and that an input form of the instruction coordinate accepted by the input accepting section is a predetermined first form;

a setting change section configured to change a predetermined setting value, of the group of setting values, stored in the storage section, in a case that after the setting value display control section displays the group of setting values on the display section and further that the input accepting section accepts an input of change operation to instruct a change of the predetermined setting value;

a first operation execution section configured to make the image forming apparatus execute a function corresponding to the button area, based on the group of setting values, in a case that after the setting value display control section displays the group of setting values on the display section and further that the input accepting section accepts an input of start operation to instruct a start of operation of the image forming apparatus; and a second operation execution section configured to make the image forming apparatus execute the function corresponding to the button area, based on the group of setting values, in a case that the instruction coordinate detected by the coordinate detection section is positioned in the button area and further that the input form accepted by the input accepting section is a predetermined second form different from the predetermined first form;

wherein in a case that the coordinate detection section detects the instruction coordinate in the button area and then the coordinate detection section newly detects another instruction coordinate in the button area, the setting change section changes the predetermined setting value to a new setting value based on a characteristic of the another instruction coordinate, and the second operation execution section makes the image forming apparatus execute the function based on the new setting value; and wherein the setting change section changes the predetermined setting value to the new setting value based on a shape of a movement locus from the instruction coordinate to the another instruction coordinate, which is detected in the button area by the coordinate detection section.

8. The image forming apparatus according to claim 7, wherein the predetermined first form is a form in which the instruction coordinate is detected in the button area by the coordinate detection section and the instruction coordinate is not detected any more by the coordinate detection section within a predetermined time period after the instruction coordinate is detected by the coordinate detection section.

9. The image forming apparatus according to claim 7, wherein the second input form includes a plurality of types of input forms, the image forming apparatus further comprises a second form selection accepting section configured to accept a selection of one of the plurality of types of input forms as the second form assigned to the button area; and to store the second form selected in the storage section.

10. An image forming apparatus which includes a plurality of functions, the image forming apparatus comprising:
a display section configured to display a plurality of button areas, which correspond to the plurality of functions respectively;
a storage section configured to store a plurality of setting values, each of which is in relation to one of the plurality of functions;
an input accepting section configured to accept an input to the display section;
a coordinate detection section configured to detect an instruction coordinate which is inputted in the display section and is accepted by the input accepting section;
a button display control section configured to assign each of the plurality of setting values, which is in relation to one of the plurality of functions and is stored in the storage section, to one of the plurality of button areas which corresponds to the one of the plurality of functions;
and to display the plurality of button areas on the display section in a form which is distinguished from another area of the display section;

a setting value display control section configured to display, on the display section, a group of setting values, among the plurality of setting values, which is assigned to a button area of the plurality of button areas, in a case that the instruction coordinate detected by the coordinate detection section is positioned in the button area and that an input form of the instruction coordinate accepted by the input accepting section is a predetermined first form;
a setting change section configured to change a predetermined setting value, of the group of setting values, stored in the storage section, in a case that after the setting value display control section displays the group of setting values on the display section and further that the input accepting section accepts an input of change operation to instruct a change of the predetermined setting value;
a first operation execution section configured to make the image forming apparatus execute a function corresponding to the button area, based on the group of setting values, in a case that after the setting value display control section displays the group of setting values on the display section and further that the input accepting section accepts an input of start operation to instruct a start of operation of the image forming apparatus; and
a second operation execution section configured to make the image forming apparatus execute the function corresponding to the button area, based on the group of setting values, in a case that the instruction coordinate detected by the coordinate detection section is positioned in the button area and further that the input form accepted by the input accepting section is a predetermined second form different from the predetermined first form;
wherein the second form is a form in which the instruction coordinate detected in the button area by the coordinate detection section is moved to another instruction coordinate in the button area at an acceleration which is not more than a predetermined acceleration, and then the another instruction coordinate is not detected by the coordinate detection section any more.

11. The image forming apparatus according to claim 10, wherein the predetermined first form is a form in which the instruction coordinate is detected in the button area by the coordinate detection section and the instruction coordinate is not detected any more by the coordinate detection section within a predetermined time period after the instruction coordinate is detected by the coordinate detection section.

12. The image forming apparatus according to claim 10, wherein the second input form includes a plurality of types of input forms, the image forming apparatus further comprises a second form selection accepting section configured to accept a selection of one of the plurality of types of input forms as the second form assigned to the button area; and to store the second form selected in the storage section.

13. An image forming apparatus which includes a plurality of functions, the image forming apparatus comprising:
a display section configured to display a plurality of button areas, which correspond to the plurality of functions respectively;
a storage section configured to store a plurality of setting values, each of which is in relation to one of the plurality of functions;
an input accepting section configured to accept an input to the display section;

a coordinate detection section configured to detect an instruction coordinate which is inputted in the display section and is accepted by the input accepting section;

a button display control section configured to assign each of the plurality of setting values, which is in relation to one of the plurality of functions and is stored in the storage section, to one of the plurality of button areas which corresponds to the one of the plurality of functions; and to display the plurality of button areas on the display section in a form which is distinguished from another area of the display section;

a setting value display control section configured to display, on the display section, a group of setting values, among the plurality of setting values, which is assigned to a button area of the plurality of button areas, in a case that the instruction coordinate detected by the coordinate detection section is positioned in the button area and that an input form of the instruction coordinate accepted by the input accepting section is a predetermined first form;

a setting change section configured to change a predetermined setting value, of the group of setting values, stored in the storage section, in a case that after the setting value display control section displays the group of setting values on the display section and further that the input accepting section accepts an input of change operation to instruct a change of the predetermined setting value;

a first operation execution section configured to make the image forming apparatus execute a function corresponding to the button area, based on the group of setting values, in a case that after the setting value display control section displays the group of setting values on the display section and further that the input accepting section accepts an input of start operation to instruct a start of operation of the image forming apparatus; and a second operation execution section configured to make the image forming apparatus execute the function corresponding to the button area, based on the group of setting values, in a case that the instruction coordinate detected by the coordinate detection section is positioned in the button area and further that the input form accepted by the input accepting section is a predetermined second form different from the predetermined first form;

wherein the second form is a form in which the instruction coordinate detected in the button area by the coordinate detection section is moved to another instruction coordinate in the button area at an acceleration which is not less than a predetermined acceleration, and then the another instruction coordinate is not detected by the coordinate detection section any more.

14. The image forming apparatus according to claim 13, wherein the predetermined first form is a form in which the instruction coordinate is detected in the button area by the coordinate detection section and the instruction coordinate is not detected any more by the coordinate detection section within a predetermined time period after the instruction coordinate is detected by the coordinate detection section.

15. The image forming apparatus according to claim 13, wherein the second input form includes a plurality of types of input forms, the image forming apparatus further comprises a second form selection accepting section configured to accept a selection of one of the plurality of types of input forms as the second form assigned to the button area; and to store the second form selected in the storage section.

* * * * *